March 23, 1965 R. R. VANNI 3,174,384
HOLDING DEVICE
Filed Nov. 28, 1962

INVENTOR.
ROBERT R. VANNI
BY
Woodling Krost Granger + Rust
Attys.

United States Patent Office 3,174,384
Patented Mar. 23, 1965

3,174,384
HOLDING DEVICE
Robert R. Vanni, 701 Tuxedo Ave.,
Brooklyn Heights, Ohio
Filed Nov. 28, 1962, Ser. No. 240,662
1 Claim. (Cl. 85—5)

The invention relates in general to holding devices and more specifically to such a device for holding two members together which is capable of being inserted through a much smaller opening than previous devices in this general field.

In the use of spring type holding devices for holding two members together by the insertion of such a device through aligned openings in the two members, it has previously been a problem in that the device, in order to be large enough to physically hold the two members together, had to have end portions which could not be inserted through the openings unless the openings were so large as to render the construction impossible from a commercial standpoint. An example of a commercial use of such a device would be in the nature of a device for holding an automobile license on the conventional holder which is provided in present day automobiles.

It is therefore an object of the present invention to provide a spring type holding device having end portions insertable through an opening in a member or members to be held which are movable to a position whereby they can be inserted through very small openings.

Another object of the present invention is to provide a holding device as above described which may be inserted through aligned openings to hold two members together wherein the openings are of the same size or either one of the openings may be larger than the other.

Another object of the present invention is to provide a holding device of the type described wherein one of the two end portions which is to be inserted through an opening is retractable to a position behind or in back of the other end portion so that the opening in effect need be large enough merely to admit the major dimension of one of the end portions.

Another object of the present invention is to provide a device which preferably is comprised of a unitary piece of spring material bent or formed into a generally circular configuration with the extreme ends having a reverse curve to hold the device in an opening whereby one of the end portions can be retracted along the curve of the other end portion so the portions can be inserted into a comparatively small opening.

Another object of the present invention is to provide a holding device as described wherein when the device is located in its position in holding two members together, a locking device is provided which prevents retraction of the end portions and removal of the device from its utilitarian position of holding the two members together.

Other objects and a fuller understanding of this invention may be had by referring to the following description and claim, taken in conjunction with the accompanying drawings, in which:

Figure 1:
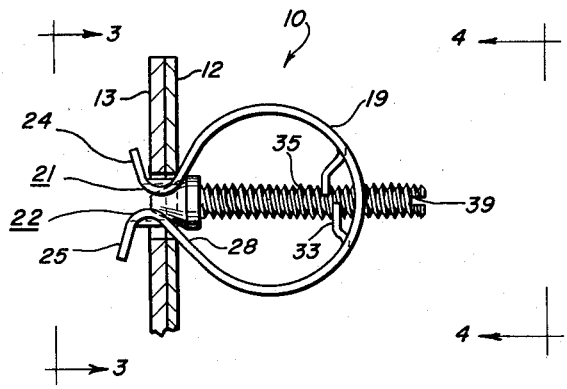
FIGURE 1 is a side elevational view of the holding device of the present invention in its position of holding two members together.

Referring specifically to the figures in the accompanying drawings, the holding device of the present invention has been indicated generally by the reference numeral 10 and as described herein has been illustrated as holding two members together. These two members might, for the sake of illustration, be a conventional license plate 12 and license plate holder 13. As illustrated, the two members 12 and 13 are provided with aligned openings 15 and 16, respectively. As illustrated herein, these openings are generally concentric and of the same size. It will be readily appreciated by those skilled in the art that the opening 15 might be larger than the opening 16 or vice versa. It would also be possible to have the openings of configurations other than circular.

Figure 2:
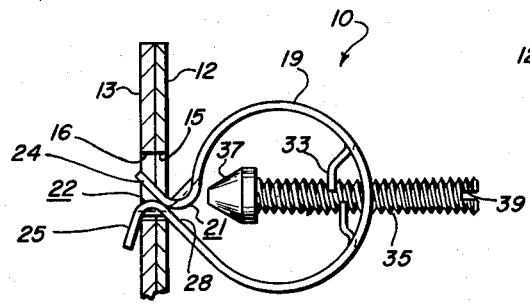
FIGURE 2 is a view similar to FIGURE 1 but showing one of the end portions of the device being retracted with the locking member unlocked as the device would be in either removing it or positioning it in its function of holding the two members together.
Figure 4:
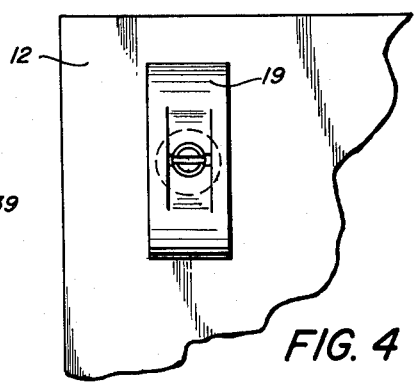
FIGURE 4 is a view taken generally along the line 4—4 of FIGURE 1.
Figure 3:
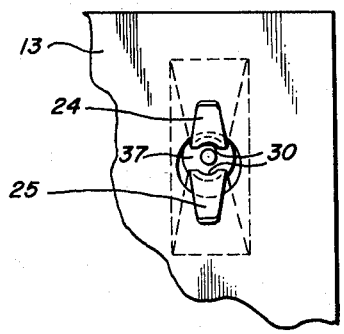
FIGURE 3 is a view taken generally along the line 3—3 of FIGURE 1.
Figure 5:
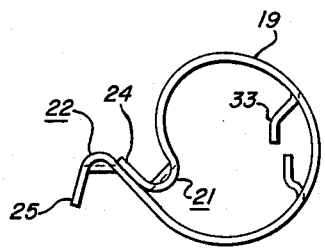
FIGURE 5 is a side elevational view of the device removed from the two members and with the locking member removed.

As illustrated herein, the holding device is comprised of a unitary member 19 constructed of spring steel material which is capable, for example of being moved from what may be referred to as its normal position in FIGURE 1 to the position of FIGURE 2, or the position of FIGURE 5, and when released by the hand of a person using the device, will spring back to the position of FIGURE 1. The unitary member 19 is provided by first and second end portions indicated generally by the reference numerals 21 and 22, and this member in the preferred embodiment shown in FIGURES 1 through 5 is formed into a generally circular configuration, and as seen in FIGURE 1 the two end portions come quite close together to generally complete the circle or the circular configuration. The extreme ends 24 and 25 of the end portions 21 and 22 are bent away from each other as shown in FIGURES 1, 2, 3 and 5 in a direction generally opposite to the direction in which they originally approached each other, and these ends 24 and 25 may be described generally as extending on a tangent to the circle or tangentially to the circle.

The first end portion 21 of the unitary member 19 is retractable along the inside surface 28 of the unitary member at the second end portion 22 (see FIGURE 5), and this as indicated brings the first end portion 21 generally behind the second end portion which enables the end portions including the extreme ends to be inserted through the openings 15 and 16 with comparative ease. It will be quite apparent to those skilled in the art that the illustrated device is capable of being inserted through an opening which is approximately one-third or less the size of the openings 15 and 16 illustrated. Wall means 30 are provided on facing sides of the first and second end portions 21 and 22, respectively, and these form what may be referred to as lock receiving portions. These lock receiving portions may be as indicated, in the nature of simple grooves, or they might be on the order of openings extending completely through the unitary member at these portions. Wall means 33 are also provided which serve to define female thread means in the unitary member at a position of the circle opposite the first and second end portions. These female thread means are formed of the material of the unitary member and are in the nature of the threads on conventional devices sometimes referred to as speed nuts. A threaded locking member 35 is provided with threads which engage the female threads 33 and this device is provided with an end portion which forms at least a portion of the surface of a cone 37 and when this conical surface 37 is engaged with the lock receiving portions as shown in FIGURE 1, the holding device cannot be removed from the openings. The locking member 35 is additional insurance that the device cannot be removed from the openings; however, the inherent resiliency of the holding device of the present invention is capable of functioning without the locking device since this resiliency will hold it in the position of FIGURE 1.

It should be additionally pointed out at this time and of course it will be apparent to those skilled in the art, that the general principles disclosed herein may be practiced without the construction of spring steel material, it being necessary that the device have an inherent resiliency or elasticity which will enable it to be conveniently pushed into a position of FIGURE 2 and which will then return, for example, to the position of FIGURE 1. The circular configuration which has been described in connection with the preferred embodiment also might be altered from the standpoint of attempting to avoid infringement of the appended claim; however, the principle of moving one of the end portions behind the other end portion in order to provide entrance of the device through a small opening will be utilized in practicing the herein disclosed invention. The structure which utilizes only a single unitary member is highly advantageous; however, it might also be possible to use some other connecting bridge type material in order to connect the two end portions together.

In operation, the device generally assumes the position of FIGURE 1 with the locking member retracted as seen in FIGURE 2 or further. In order to secure the two members 12 and 13 together, the openings 15 and 16 are preferably aligned and the first end portion 21 is retracted behind the second end portion 22 generally as shown in FIGURE 2 or perhaps further to the FIGURE 5 position. The end portions are then inserted through the aligned openings and the first end portion is released, with the inherent resiliency of the unitary member causing the device to assume the position of FIGURE 1. The locking member is then screwed into the position of FIGURE 1 for example, by the use of a screw driver in the groove 39. The holding device is then in its position of ultimate use, and of course in order to remove the device the reverse procedure is used.

It will thus be seen that the holding device of the present invention carries out the objects as set forth hereinabove, and particularly accomplishes the object of providing a device which can be quickly and conveniently utilized and thereafter assuredly locked in position. This construction is such that it is not as susceptible of being rusted into a permanent position because of the use of corrosive elements which are used on roadways to melt ice and snow in the winter season, thereby preventing removal except by the use of a hacksaw or chisel.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

A holding device for securing two members together which have aligned openings comprising a unitary member of spring steel material having first and second end portions, said member being formed into a generally circular configuration with said end portions approaching each other to complete the circle, the extreme ends of said end portions being bent away from each other in a direction generally tangent to the circle, said first end portion of said unitary member being retractible along the inside surface of said second end portion to enable the entrance of said end portions through the aligned openings in the two members, wall means on facing sides of each said first and second end portions defining lock receiving portions, wall means defining female thread means in said unitary member at a position of the circle opposite said first and second end portions, and a threaded locking member threadably engaging said female thread means and having an end portion engageable with said lock receiving portions to lock said end portions and prevent retraction of first end portion and removal of said end portions from the openings in the two members.

References Cited in the file of this patent
UNITED STATES PATENTS

| | | |
|---|---|---|
| 1,881,836 | Mitchell | Oct. 11, 1932 |
| 2,065,843 | Van Uum | Dec. 29, 1936 |

FOREIGN PATENTS

| | | |
|---|---|---|
| 542,127 | Great Britain | Dec. 29, 1941 |